United States Patent [19]

Van Order

[11] Patent Number: 5,056,853
[45] Date of Patent: Oct. 15, 1991

[54] SNAP-IN VISOR MOUNT

[75] Inventor: Kim L. Van Order, Hamilton, Mich.

[73] Assignee: Prince Corporation, Holland, Mich.

[21] Appl. No.: 493,419

[22] Filed: Mar. 14, 1990

Related U.S. Application Data

[62] Division of Ser. No. 394,937, Aug. 16, 1989, Pat. No. 4,989,911.

[51] Int. Cl.⁵ .................................................. B60J 3/00
[52] U.S. Cl. .................................... 296/97.9; 248/27.3
[58] Field of Search ................ 296/97.1, 97.9, 97.13; 248/27.1, 27.3, 231.8

[56] References Cited

U.S. PATENT DOCUMENTS

| | | | |
|---|---|---|---|
| 2,356,934 | 8/1944 | Ketchem | 248/27.1 |
| 2,488,849 | 11/1949 | Churchill | 248/22.1 X |
| 2,512,188 | 6/1950 | Wait et al. | 248/27.1 |
| 4,178,035 | 12/1979 | Cziptschirsch | 296/97 |
| 4,352,518 | 10/1982 | Prince et al. | 296/97 |
| 4,377,020 | 3/1983 | Vigo | 296/97.13 X |
| 4,529,157 | 7/1985 | Suman et al. | 248/289 |
| 4,553,797 | 11/1985 | Marcus | 296/97.9 X |
| 4,569,552 | 2/1986 | Marks | 296/97 |
| 4,634,196 | 1/1987 | Nestell | 296/97.9 X |
| 4,729,590 | 3/1988 | Adams | 296/97 |
| 4,844,533 | 7/1989 | Dowd et al. | 296/214 |
| 4,893,866 | 1/1990 | Dowd et al. | 296/214 |
| 4,893,867 | 1/1990 | Hilborn et al. | 296/214 |
| 4,902,068 | 2/1990 | Dowd et al. | 296/214 |
| 4,913,484 | 4/1990 | Dowd et al. | 296/97 |

FOREIGN PATENT DOCUMENTS

| | | |
|---|---|---|
| 2341940 | 8/1973 | Fed. Rep. of Germany . |
| 7415154 | 4/1974 | Fed. Rep. of Germany . |
| 1251479 | 6/1970 | United Kingdom . |

Primary Examiner—Johnny D. Cherry
Assistant Examiner—Gary C. Hoge
Attorney, Agent, or Firm—Price, Heneveld, Cooper, DeWitt & Litton

[57] ABSTRACT

A snap-in visor rod mounting assembly includes a mounting plate which is adapted to receive a conventional visor rod mounting bracket. The plate is provided with a spring either integrally formed thereon or attached thereto. The visor rod mounting bracket is pre-assembled to the mounting plate in a conventional manner and subsequently the mounting plate is snap-fitted into an aperture formed in the vehicle roof during assembly of the visor into the vehicle.

12 Claims, 3 Drawing Sheets

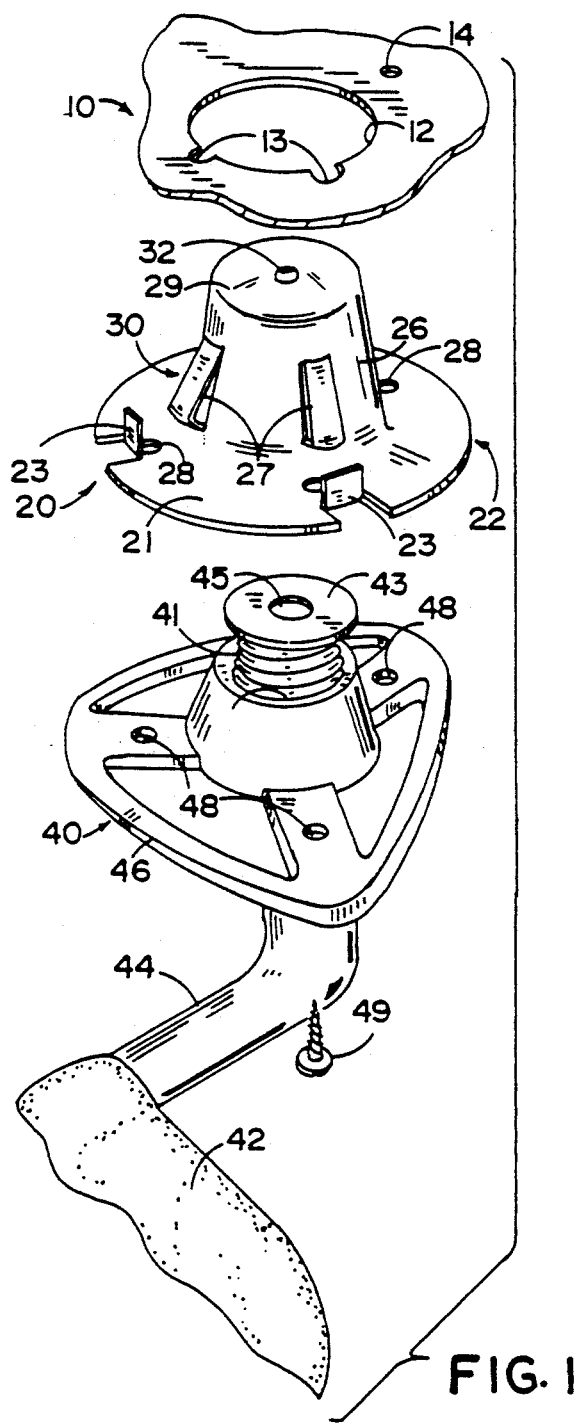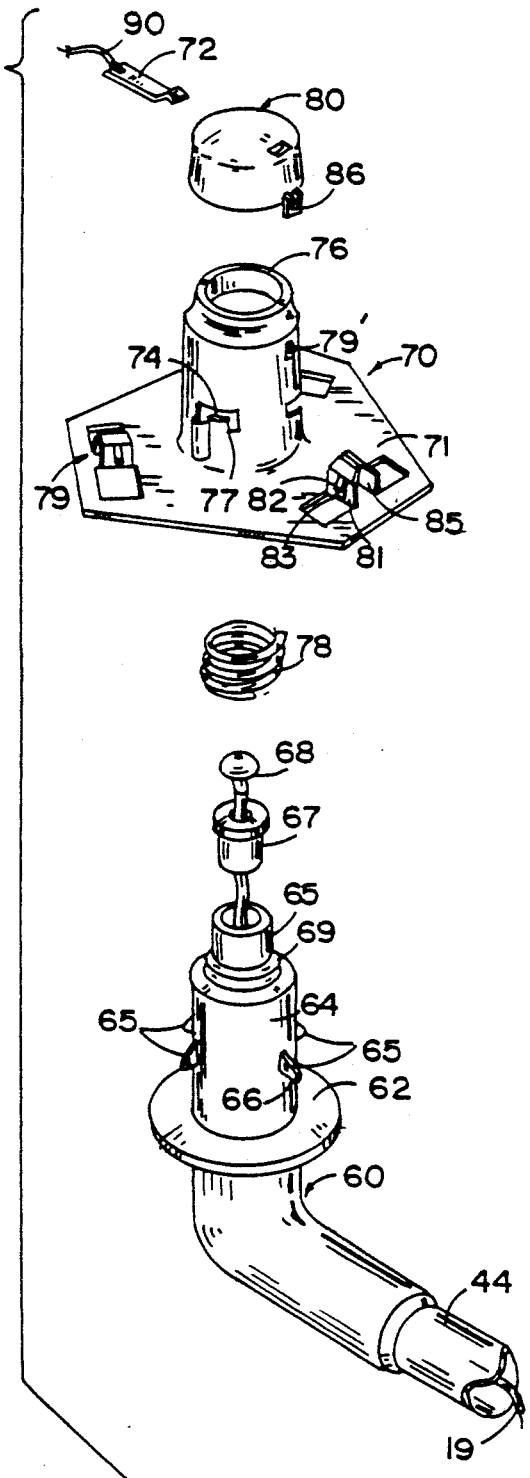

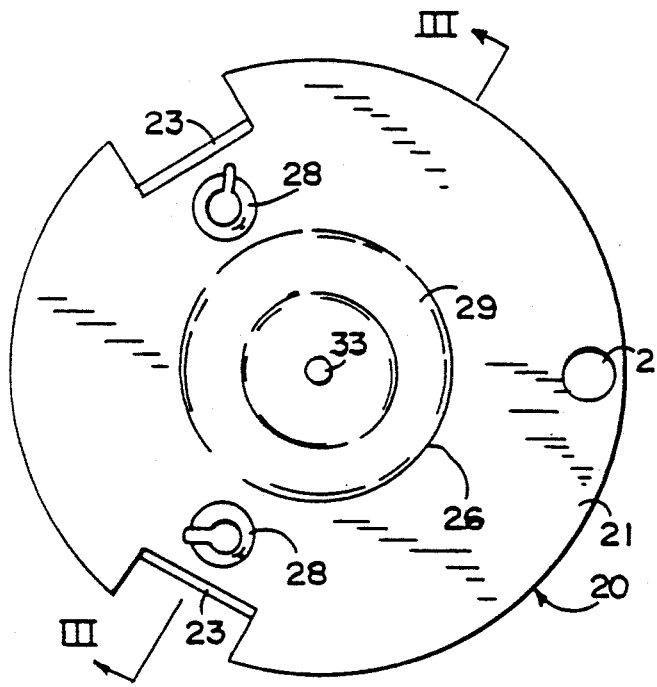
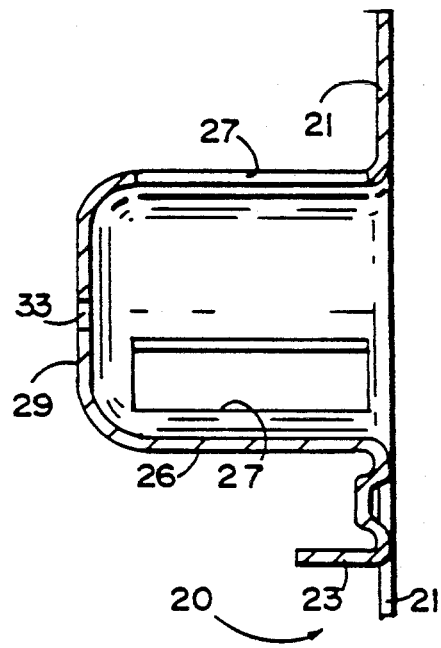
FIG. 2          FIG. 3
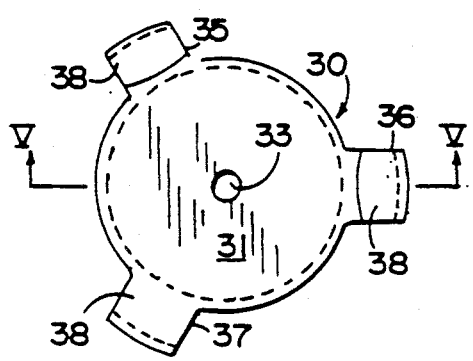
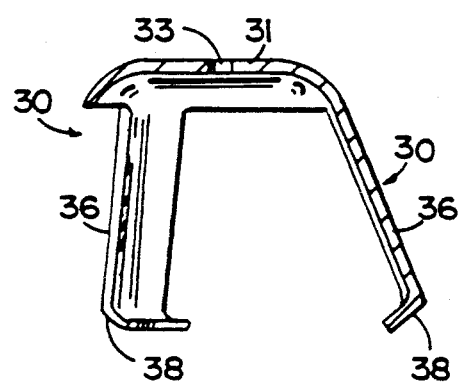
FIG. 4          FIG. 5

SNAP-IN VISOR MOUNT

This is a divisional of copending application Ser. No. 07/394,937 filed on Aug. 16, 1989, U.S. Pat. No. 4,989,911.

BACKGROUND OF THE INVENTION

The present invention pertains to a mounting assembly and particularly one used for attaching the end of a visor pivot rod to the roof of a vehicle.

There exists a variety of manners in which vehicle visors are attached to the roof and/or headliner of a vehicle. U.S. Pat. No. 4,569,552 discloses a spring-clip used in connection with a molded-on torque fitting for a visor rod. The combination then snap-fits within the vehicle roof. Other attachment systems have employed mounting screws which extend through a conventional visor mounting bracket and then extend directly into the sheet metal roof of the vehicle. However, such a system is somewhat difficult to quickly install along the vehicle assembly line since it requires some skill and dexterity. Thus the snap-in type construction is preferable from an ease and cost of manufacturing standpoint.

SUMMARY OF THE PRESENT INVENTION

The system of the present invention provides an improved snap-in visor rod mounting assembly in which a mounting plate is adapted to receive a conventional visor rod mounting bracket The plate is provided with spring means either integrally formed thereon or attached thereto. The visor rod mounting bracket is preassembled to the mounting plate in a conventional manner and subsequently the mounting plate is snap-fitted into an aperture formed in the vehicle roof during assembly of the visors into the vehicle. In one embodiment of the invention, the spring means includes legs with ends or tabs, which lockably grip the sheet metal material of the vehicle roof in compression for securely locking the mounting plate to the vehicle roof once installed.

Such construction provides means for mounting existing visor assemblies to a vehicle utilizing the mounting system of the present invention thereby providing ease of assembly during the automotive manufacturing process. These and other features, objects and advantages of the present invention will become apparent upon reading the following description thereof together with reference to the accompanying drawings in which:

BRIEF DESCRIPTION OF THE DRAWINGS

FIG. 1 is an exploded perspective view of one embodiment of the present invention;

FIG. 2 is a top plan view of the mounting plate shown in FIG. 1;

FIG. 3 is a cross-sectional view taken along section lines III—III of FIG. 2;

FIG. 4 is a top plan view of a spring associated with the mounting plate shown in FIG. 1;

FIG. 5 is a cross-sectional view taken along section lines V—V of FIG. 4;

FIG. 10 is an exploded perspective view of another alternative embodiment of the present invention.

DETAILED DESCRIPTION OF THE PREFERRED EMBODIMENT

Figure 6:
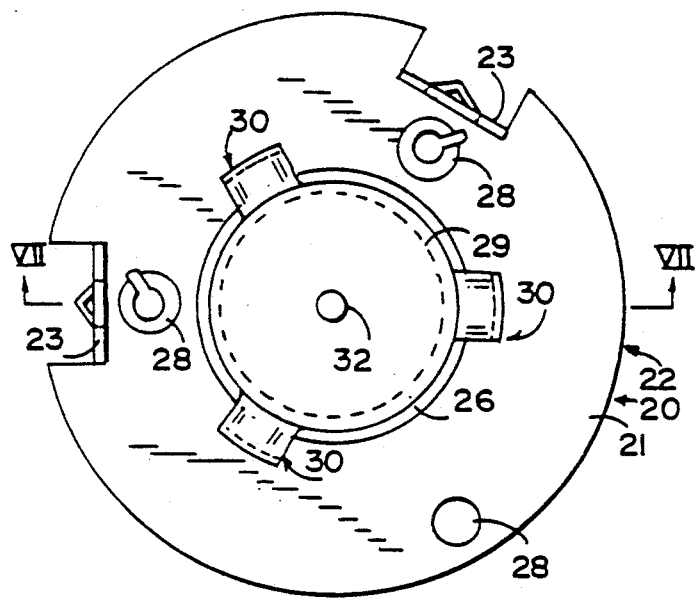
FIG. 6 is a top plan assembled view of the mounting plate assembly shown in FIG. 1.

Referring initially to FIG. 1 there is shown a section of vehicle roof 10 having an aperture 12 formed therein and configured to lockably receive the mounting plate assembly 20 of the present invention to which, in turn, there is attached a visor assembly 40 including a visor 42 and visor rod 44. Assembly 40 includes a mounting bracket 46 of generally conventional construction with the end 45 of visor pivot rod 44 extending upwardly through the central aperture 47 in bracket 46 and secured in tension therein utilizing a compression spring 41 and locking nut 43 in a conventional manner.

The other end of visor rod 44 extends into the body of visor 42 and is mounted thereto for pivotal rotation between a raised stored position or various lowered use positions by a visor rod torque fitting such as disclosed in U.S. Pat. No. 4,500,131. Rod end 45 likewise pivots vertically about the longitudinal axis of aperture 47 of bracket 46. Visor assembly 40 is secured to the mounting plate assembly 20 by fastening means consisting of a plurality of sheet metal screws 49 which extend upwardly through three apertures 48 around the generally triangular bracket 46 and into apertures 28 similarly located and aligned in mounting plate 22 of assembly 20.

Assembly 20 in the preferred embodiment shown and as seen in detail in FIGS. 2-8 includes a generally hat-shaped mounting plate 22 and a spring member 30 mounted therein and secured to plate 22 by means of a rivet 32. Plate 22 has an inverted cup-shaped top with a peripheral annular lower flange 21 through which apertures 28 are formed. The steel member is a draw formed with a cylindrical side 26 through which there is formed three longitudinally extending rectangular slots 27 spaced at 120° intervals therearound and extending from an area adjacent the top 29 of member 22 to the junction of side 26 with flange 21. The outer peripheral of flange 21 includes a pair of upwardly formed indexing tabs 23 which lockably enter and engage recesses 13 of configured aperture 12 for preventing rotation of the assembly 20 with respect to the sheet metal roof 10 of the vehicle. One of the fastening screws 49 extends through an aperture 14 in roof 10 to provide further locking of the members although it is not threaded into the aperture but merely extends through the aperture. Apertures 28 are dimensioned and located such that the sheet metal screws 49 secure the flange 21 to the upper surface of bracket 46 during preassembly of the visor assembly 40 to mounting plate assembly 20.

Figure 8:
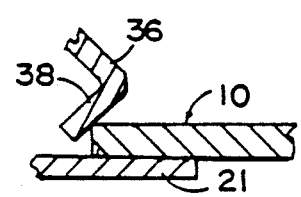
FIG. 8 is an enlarged fragmentary view of a portion of the structure shown in FIG. 7 shown installed in a vehicle roof.

Spring 30 in the preferred embodiment comprises, as best seen in FIGS. 4 and 5, a generally spider-shaped member having a circular body 31 into which there is formed an aperture 33 for receiving a rivet 32 which secured the spring to member 22 through an aperture in member 22 coaxially aligned with aperture 33. Spring 30 also includes three downwardly and outwardly projecting legs 35, 36 and 37 each of which include an inwardly and downwardly depending tip 38 for lockably engaging the sheet metal roof material 10 of the vehicle as best seen in FIG. 8. Each of the legs 35, 36 and 37 extend outwardly at an angle of approximately 68° from the horizontal top surface 31 of spring 30, while ends 38 extend inwardly at an angle of approximately 71° from the longitudinal axis of each of their associated legs 35, 36 and 37.

Member 22 is made of a 1008-1010AKDQ steel, draw formed into the shape shown in the Figs. while spring 30 is manufactured of a 1074 spring steel having a thickness of approximately 1/32 seconds of an inch. Legs 38 extended in the preferred embodiment inwardly a distance of approximately ¼ of an inch to provide secure locking against the 1.5 millimeter sheet roof material 10 when the member was snap-fitted into an aperture in the roof as illustrated in FIGS. 7 and 8.

Figure 7:
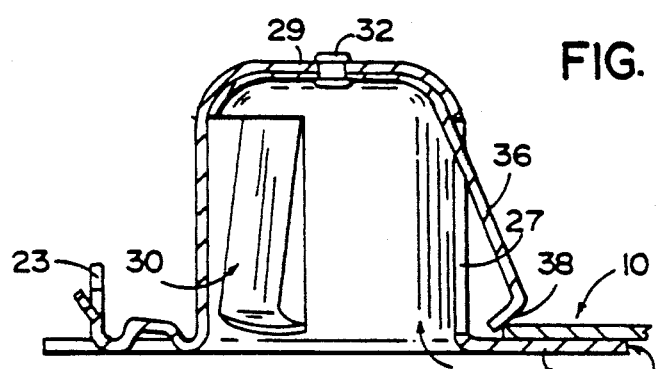
FIG. 7 is a cross-sectional view of the structure shown in FIG. 6 taken along section line VII—VII of FIG. 6.

The mounting plate assembly 20 is assembled by pressing the spring member 30 upwardly into the downwardly extending cup-shaped opening 24 (FIG. 7) of plate 22 and in alignment with slots 27 until the legs 35, 36 and 37 extend outwardly through the slots as seen in FIG. 7. Rivet 32 then attaches the two members in coaxially alignment as seen in FIGS. 1 and 7. The bracket 46 is secured to mounting plate assembly 20 by screws 49. This assembly process is typically achieved by the visor manufacturer who then ships the completed visor sub-assembly including the snap-in mounting plate assembly 20 to the automotive manufacturer.

During the manufacture of the vehicle itself, the cylindrical top 26 of the mounting plate assembly is simply press-fitted upwardly into aperture 12 in the roof 10 of the vehicle with tabs 23 extending into alignment with enlarged slots 13 of the outer periphery of otherwise circular aperture 12 in the roof. The end of one of the screws 49 also extends upwardly through aperture 14 for indexing the visor for left or right side use depending on which side the visor is being installed. Thus during the assembly of the vehicle, the visor sub-assembly simply snap-fits and locks into the vehicle as it is pushed upwardly during assembly until the spring loaded legs 35, 36 and 37 snap into the locking position shown in FIG. 8 which can be felt during the installation process.

Figure 9:
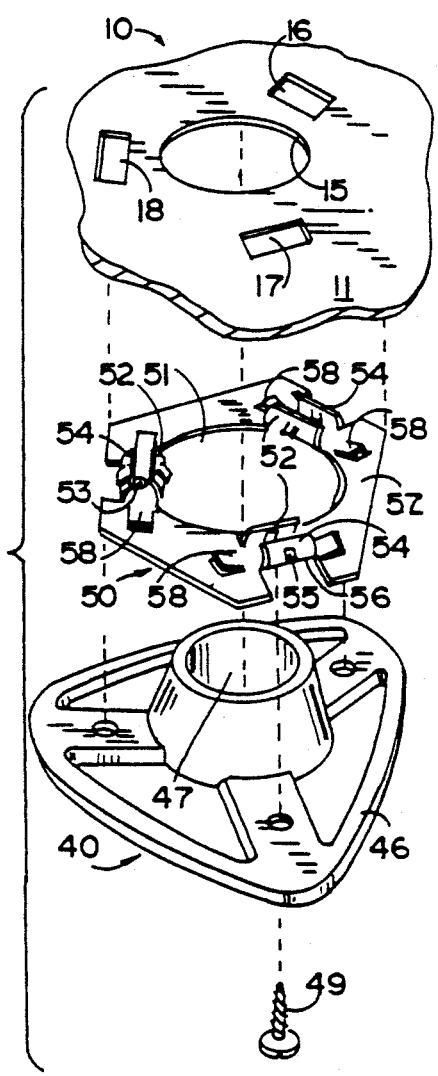
FIG. 9 is an exploded perspective view of an alternative embodiment of the present invention.

An alternative embodiment of the present invention is shown in FIG. 9 in which similarly shaped assemblies are identified with the same reference numerals. A mounting plate 50 shown in FIG. 9 is a generally truncated triangular member made of a spring steel and including pairs of facing outer and inner curved upwardly extending legs 52 and 54 each of which include an outwardly and downwardly extending tabs 55. The mounting plate 50 includes a central circular opening 51 for receiving the collar of a visor mounting bracket 46 while the roof 10 of the vehicle includes a similar circular aperture 15. Spaced around aperture 15 and aligned with upwardly and inwardly curved legs 52 and 54 are three equally spaced rectangular apertures 16, 17 and 18. The lower edges 56 of tabs 55 are spaced with respect to the upper surface 57 of plate 50 such that they engage the top surface 11 of the sheet metal roof when the mounting plate 50 is pushed upwardly into the apertures 16, 17 and 18 of the roof after preassembly of the visor mounting assembly 40 to mounting plate 50. In order to provide a continuous bias force between the mounting plate and the sheet metal roof, plate 50 also includes a plurality of upwardly formed spring tabs 58 extending on opposite sides of each of the mounting members 52 and 54 to further assist in lockably and compressibly holding the roof material 10 between the lower edges 56 of tabs 55 and the upper surface 57 of plate 50. Between each of the spring tabs 52 and 54 there is provided a circular aperture 53 into which the fasteners 49 are threadably secured for attaching the visor assembly 40 to the mounting plate 50 prior to the snap-in insertion of the visor and mounting plate into the vehicle roof 10.

Yet another embodiment of the invention is shown in FIG. 10 in which an electrified visor pivot rod connection is provided. In the embodiment shown in FIG. 10 a hollow pivot rod 44 has an integrally molded polymeric torque fitting 60 formed thereon by a molding process such as described in U.S. Pat. No. 4,352,518. Torque fitting 60 may be made of a suitable polymeric material such as an acetal homopolymer or the like and includes an annular flange 62 spaced upwardly from an independent elbow trim member 66. The upper cylindrical section 64 of fitting 60 includes three equally spaced triangular projections 65 with flat lower surfaces 66 which lockably engage a bayonet socket formed in mounting plate 70. An electrical conductor 19 extends through the center of pivot rod 44 and terminates in a generally cylindrical insulative spacer 67 with the wire 19 terminating in a button electrical contact 68. The outer diameter of collar 64 of fitting 60 extends upwardly into the circular generally cup-shaped mounting plate 70 which includes inverted L-shaped bayonet mounting slots 74 therein having clearance tunnels 75 permitting tabs 65 to extend upwardly into the slots 74 and subsequently drop downwardly into the bottom 77 of slots 74 under the force of a compression spring 78 extending between the top annular section 69 of fitting 60 and a cover cap 80 for the open end 76 of plate 70.

Plate 70 includes three upwardly formed sets of mounting means 79 each comprising a pair of facing spaced upwardly and inwardly extending legs 81 having an outwardly and downwardly extending tab 82 having a lower edge 83 which engages the top surface of the sheet metal roof with the top surface 71 of mounting plate 70 engaging the opposite side of the roof. Legs 81 are inwardly tapered at their ends 85 to facilitate insertion into generally rectangular axially outwardly extending slots (not shown) in the sheet metal roof of the vehicle such that plate 70 to which the visor assembly including torque fitting 60 has been previously attached can be snap-fitted to the vehicle headliner.

Cap 80 is locked onto the end 76 of plate 70 by means of a locking tab 79' and latch 86 on cap 80. A conductor 90 having a contact 92 is coupled at one end to the connector of a conductor which extends through an opening, such as a circular opening 15 shown in FIG. 9, in the vehicle roof and at its opposite end to contact 68 through a slot in cap 80.

During assembly of the structure shown in FIG. 10 cap 80 with conductor 90 is fitted over the open end 76 of the mounting plate placing spring 78 into the cap end of plate 70 and pushing assembly 60 upwardly into the socket of the mounting plate and twisting approximately 20° and releasing the pressure so that the bayonet mounting is completed. The visor sub-assembly is then snap-fitted in the vehicle roof as in the previous embodiments. Various modifications of the preferred embodiments of the invention will become apparent to those skilled in the art but will fall within the spirit and scope of the invention as defined by the appended claims.

The embodiments of the invention in which an exclusive property or privilege is claimed are defined as follows:

1. A mounting assembly for mounting a vehicle accessory to a sheet metal structure of a vehicle comprising:

a generally planar mounting plate having a central opening and at least one aperture spaced from said central opening for receiving an accessory fastening means;

first fastening means for attaching a vehicle accessory to said plate; and second fastening means for attaching said mounting plate to said sheet metal structure, wherein said second fastening means is separate from said first fastening means, and said second fastening means comprises spring means integrally formed in said mounting plate and shaped to extend into aperture means formed in said vehicle sheet metal structure for locking said plate to the vehicle such that the accessory and plate can be preassembled and such assembly subsequently installed by snap-fitting it into the vehicle.

2. The apparatus as defined in claim 1 wherein said spring means comprises at least one pair of facing upwardly and inwardly inclined legs having outwardly and downwardly formed tabs with ends which engage one side of the sheet metal while the surface of said plate proximate said legs engages an opposite side of the sheet metal.

3. A mounting assembly for mounting a vehicle accessory to the sheet metal structure of a vehicle comprising:

a mounting plate having at least one aperture for receiving an accessory fastening means;

fastening means for attaching a vehicle accessory to said plate; and spring means associated with said mounting plate and shaped to extend into aperture means formed in a vehicle sheet metal structure for locking said plate to the vehicle such that the accessory and plate can be preassembled and such assembly subsequently installed by snap-fitting it into the vehicle wherein said spring means is integral with said plate, wherein said spring means comprises at least one pair of facing upwardly and inwardly inclined legs having outwardly and downwardly formed tabs with ends which engage one side of the sheet metal while the surface of said plate proximate said legs engages an opposite side of the sheet metal, and wherein said plate further includes a plurality of spring tabs extending upwardly to engage the opposite side of the sheet metal to urge said ends of said tabs toward said one side of the sheet metal.

4. The apparatus as defined in claim 3 wherein said aperture in said plate is positioned between said legs of said spring means.

5. A mounting assembly for mounting a vehicle accessory to the sheet metal structure of a vehicle comprising:

a mounting plate having at least one aperture for receiving an accessory fastening means wherein said plate includes a cup-shaped top and said aperture means of said plate defines a bayonet socket in the sides of said cup-shaped top;

fastening means for attaching a vehicle accessory to said plate; and spring means associated with said mounting plate and shaped to extend into aperture means formed in a vehicle sheet metal structure for locking said plate to the vehicle such that the accessory and plate can be preassembled and such assembly subsequently installed by snap-fitting it into the vehicle.

6. A mounting plate assembly for mounting a vehicle visor bracket to the roof of a vehicle comprising:

a visor having a mounting bracket;

a generally planar mounting plate having a central opening and at least one aperture spaced from said central opening for receiving first fastening means for attaching said plate to said bracket; and second fastening means for attaching said mounting plate to said vehicle roof, wherein said second fastening means is separate from said first fastening means, and said second fastening means comprises spring means associated with said mounting plate and shaped to extend into aperture means formed in said vehicle roof for locking said plate to the roof such that the visor bracket and plate can be preassembled and such assembly subsequently installed by snap-fitting it into the vehicle wherein said spring means is integral with said plate and positioned adjacent said aperture.

7. The apparatus as defined in claim 6 wherein said spring means comprises at least one pair of facing upwardly and inwardly inclined legs having outwardly and downwardly formed tabs with ends which engage one side of the roof while the surface of said plate proximate said legs engages an opposite side of the roof.

8. A mounting plate assembly for mounting a vehicle visor bracket to the roof of a vehicle comprising:

a visor having a mounting bracket;

a mounting plate having at least one aperture for receiving fastening means for attaching said plate to said bracket; and spring means associated with said mounting plate and shaped to extend into aperture means formed in a vehicle roof for locking said plate to the roof such that the visor bracket and plate can be preassembled and such assembly subsequently installed by snap-fitting it into the vehicle wherein said spring means is integral with said plate, wherein said spring means comprises at least one pair of facing upwardly and inwardly inclined legs having outwardly and downwardly formed tabs with ends which engage one side of the roof while the surface of said plate proximate said legs engages an opposite side of the roof, and wherein said plate further includes a plurality of spring tabs extending upwardly to engage the opposite side of the roof to urge said ends of said tabs toward said one side of the roof.

9. The apparatus as defined in claim 8 wherein said aperture in said plate is positioned between said legs of said spring means.

10. A mounting plate assembly for mounting a vehicle visor bracket to the roof of a vehicle comprising:

a visor having a mounting bracket;

a mounting plate having at least one aperture for receiving fastening means for attaching said plate to said bracket wherein said plate includes a cup-shaped top and said aperture means of said plate defines a bayonet socket in the sides of said cup-shaped top; and spring means associated with said mounting plate and shaped to extend into aperture means formed in a vehicle roof for locking said plate to the roof such that the visor bracket and plate can be preassembled and such assembly subsequently installed by snap-fitting it into the vehicle.

11. A mounting system for receiving a screw fastener visor mounting bracket to a vehicle roof support by a snap-in assembly during vehicle manufacturing comprising:

a screw-type visor mounting bracket for securing an end of a visor to a vehicle;

a mounting plate shaped to receive said screw-type visor mounting bracket, said plate including apertures aligned for receiving fastening screws such that said bracket and plate can be preassembled by securing said bracketed to said plate; and locking means associated with said plate for lockably fitting within an aperture formed in a vehicle roof support when said preassembled bracket and plate are pushed toward the roof aperture such that said locking means engages the roof support and secures said plate and bracket to the vehicle roof by a snap-in action, wherein said locking means comprises spring means integrally formed in said plate, said spring means including legs which engage a side of the roof support opposite said plate to compressibly hold the assembly to the vehicle roof, wherein said legs include ends which extend in offset relationship to said legs for gripping the roof support.

12. The apparatus as defined in claim 11 wherein said bracket is a visor pivot rod bracket.

* * * * *

UNITED STATES PATENT AND TRADEMARK OFFICE
CERTIFICATE OF CORRECTION

PATENT NO. : 5,056,853
DATED : October 15, 1991
INVENTOR(S) : Kim L. Van Order

It is certified that error appears in the above-indentified patent and that said Letters Patent is hereby corrected as shown below:

Column 1, line 29:
  After "bracket" insert --.--;

Column 4, line 36:
  After "roof" delete "," and insert --.--

Column 7, claim 11, line 9:
  "bracketed" should be --bracket--.

Signed and Sealed this

Fifteenth Day of June, 1993

Attest:

MICHAEL K. KIRK

Attesting Officer        Acting Commissioner of Patents and Trademarks